UNITED STATES PATENT OFFICE.

ALBERT P. MEYER, OF ASPINWALL, PENNSYLVANIA, ASSIGNOR TO ALLEN S. DAVISON COMPANY, OF PITTSBURGH, PENNSYLVANIA, A CORPORATION OF PENNSYLVANIA.

FURNACE-LINING.

1,160,085.     Specification of Letters Patent.     Patented Nov. 9, 1915.

No Drawing.     Application filed April 22, 1915. Serial No. 23,272.

*To all whom it may concern:*

Be it known that I, ALBERT P. MEYER, a citizen of the United States, residing at Aspinwall, in the county of Allegheny and State of Pennsylvania, have invented certain new and useful Improvements in Furnace-Linings, of which the following is a specification.

This invention relates to furnace linings; and it comprises as a new article a uniform and intimate mixture of granules of basic slag and dolomitic lime (that is, magnesian lime), said dolomitic lime being advantageously hard burnt, and still more advantageously being burnt to a degree sufficient to afford a sintered, clinkered or semi-fused texture to the granules of said lime; and it also comprises a method of making such material wherein dolomitic limestone is crushed, sized and burnt in granular form under conditions analogous to those of cement clinker making, but with higher finishing temperature, such as a temperature around 2800 F., whereby the granules are more or less sintered or clinkered, and the granules thus produced are admixed with granules or basic slag; all as more fully hereinafter set forth and as claimed.

In the operation of ordinary basic open hearth furnaces for the refining of iron it is customary to heat the iron with iron ore, iron scrap, etc., and during the fusion of the iron and admixtures to add more or less basic material, generally in the form of lime. A number of complicated actions go forward, into which it is not necessary to enter here further than to say that in a general way the action is to burn out the non-metallic impurities of the iron, that is silicon, phosphorus, etc., and cause them to unite with the lime. In providing a furnace chamber for performing this operation the hearth is lined with a material which must be as indifferent as possible to the actions going forward and which in practice is always a material of basic nature. This hearth lining while made as resistant as possible of course erodes more or less and it is necessary to patch it from time to time, this being done between heats.

The material of the hearth lining is sometimes magnesia or magnesite; but is more frequently dolomitic lime. In making the lining, or in repairing it, granular dolomitic lime is simply tamped into place and caused to bond by the heat of the furnace. As a temporary bond, in making or repairing sometimes tar is mixed with the granules. In heating up, the tar chars and disappears but it and the pitch and carbon it yields serve to maintain the layer in place until the temperature is sufficient to cause what may be termed an autogenous bond; a sintering or fritting together of the granules. This autogenous bonding however requires a very high temperature if the material be reasonably free from silica or other fluxes, as it is desirable it should be; a temperature which with good dolomite lime may be as high as 3000° F. Addition of silica and most other bonding fluxes to the material is not practicable for a number of reasons. As regards silicia, if it be used as a fine sand it does not remain in place; and in any event it is apt to make the lining too fusible and subject to erosion. And as a large part of the function of the basic furnace is to remove slica from the charge, additions of silica in the lining is not desirable.

I have found that I can produce a very desirable type of lining for these basic open hearth furnaces by use of an intimately mixed composition of granular dolomitic lime and granular basic open hearth slag. This slag being material which is produced in the furnace itself, its presence in the lining cannot change the operation of the furnace in any way; while it is a good binding agent for the dolomitic lime. In practice, a lining made of a granular mixture of dolomitic lime and basic slag forms a hard, compact and permanent hearth lining, a hearth lining which is, as compared with the ordinary type, slow of erosion and is resistant to the furnace action. When it is necessary to patch such lining, the same mixture tamped into place gives a hard, compact layer at once; the normal heat of the furnace being, of course, sufficient to fuse the slag bond.

While any dolomitic lime may be used within the purview of my invention it is not a matter of indifference as to the type used. I find it much more advantageous to use hard, compact and dense varieties of dolomitic lime; and varieties high in magnesia. The most advantageous is a high magnesia lime that has been heated until it has undergone sintering, clinkering and semi-fusion. Such a sintered lime is very dense, hard and resistant. In granulated form in connection with sufficient basic slag to fill the voids it gives an unusually advantageous type of material for lining and patching.

While other proportions of slag and of lime may be employed I find it best in a general way to use a mixture containing between 10 per cent. and 25 per cent. basic slag. The higher the magnesia the more basic slag should be used. With a lime carrying 40 per cent. magnesia about 10 per cent. of basic open hearth slag may be added. With 50 per cent. or 60 per cent. magnesia the proportion of slag may be raised as high as 25 per cent.

An advantageous way of making a highly suitable variety of dolomitic lime for the present purposes is to crush the limestone to, say, ⅜ inch granules and then dry thoroughly; which may be done in any ordinary type of drier. The material may then be screened to get rid of dust and the granular dust-free material fed down through a rotary kiln under conditions analogous to those obtaining in burning Portland cement; that is the material passes through a calcining zone where it is freed of carbon dioxid and then passes under the direct influence of a high temperature flame where it is raised to a temperature sufficient to produce incipient fusion, that is sintering or clinkering. Any of the usual types of rotary kilns may be used. The operation, however, differs from cement making in that the raw material is supplied in granular form and the finished material emerges as granules instead of lumps or clinkers. To produce sintering of dolomitic lime a rather high temperature is requisite; the temperature in the clinkering zone should be around 2800° F. A temperature of 2400° F. will shrink and condense the material but will produce no fusion with a fairly pure material, that is a material carrying very little silica or other fluxing bodies. This high sintering temperature may be readily obtained by the use of a natural gas flame burning with a good air blast. An air blast may be used without danger here since the material is not in powder and is not readily carried forward. Other means of obtaining a high temperature in the clinkering zone may be used. Powdered coal may be used. Producer gas flames with regenerator devices may be used. Regenerators are practicable because of the absence of dust.

Magnesian lime made as just described is of maximum density and hardness and is much better than material which has been simply heated to calcine and shrink it, but without production of sintering. The mixture of dolomitic lime and basic open hearth slag in the proportions indicated may be packed, shipped and used without fear of change from atmospheric moisture or other influences where the lime is high in magnesia and is hard burned. Where the lime has been sintered in the described manner the mixture is absolutely permanent. The mixture of the two materials may be made at the point where it is to be used; that is the slag and lime may be mixed at the place of use; but ordinarily I prefer to make the mixture at the point of manufacture. The mixture may be shipped in bulk without fear of change.

In the typical embodiment of this invention I crush a dolomite rock to about ⅜ inch granules and screen out the dust. The granular material I next send through a rotary internally fired drier to get rid of moisture. The dried material I next burn in a rotary kiln. A kiln 120 feet long and 6 feet in internal diameter has proved satisfactory. The kiln may be fired in any way so as to produce a very hot clinkering zone. A temperature of 2800° F., or as much more as the kiln will stand, may be used. With natural gas firing a forced blast of air may be used; introducing, say, ten times as much air as gas. With this temperature the granules become internally sintered or semi-fused but do not unite to clinker lumps. The cooled sintered granules may next be admixed with granulated basic slag and stored or shipped. Or the basic slag may be mixed with the hot granules of lime as it comes from the kiln and the mixture sent through a rotary cooler; this gives a good and intimate mixture. With the lime running 40 per cent. magnesia a mixture of 90 parts lime and 10 parts slag works well.

What I claim is:—

1. As a new composition of matter an intimate mixture of granulated dolomitic lime and sufficient granulated basic open hearth slag to serve as a binder therefor.

2. As a new composition of matter an intimate mixture of granulated hard burnt dolomitic lime and sufficient granulated open hearth slag to serve as a binder therefor.

3. As a new composition of matter an intimate mixture of granulated hard burnt and sintered dolomitic lime and sufficient granulated basic open hearth slag to serve as a binder therefor.

4. As a new material, a mixture of granulated hard burnt dolomitic lime with basic slag, said basic slag being present in volume corresponding to the voids between the granules of lime.

5. The process of making material for furnace lining which comprises granulating dolomitic limestone, calcining the granulated material, heating to a temperature sufficient to cause sintering, cooling and mixing the granulated material with sufficient granulated basic slag to serve as a binder therefor.

6. The process of making material for furnace lining which comprises granulating dolomitic limestone, calcining the granulated material, heating to a temperature of around 2800° F., and mixing the granulated material with sufficient granulated basic slag to serve as a binder therefor.

7. The process of making hard, dense and resistant furnace linings which comprises burning granulated dolomitic lime to calcine and sinter the same, mixing with sufficient granulated basic slag to afford binder to fill the voids, and heating the mixture.

In testimony whereof I have hereunto set my hand.

ALBERT P. MEYER.